March 6, 1945.  W. H. T. HOLDEN  2,370,727
TIME MEASURING SYSTEM
Filed Dec. 11, 1942
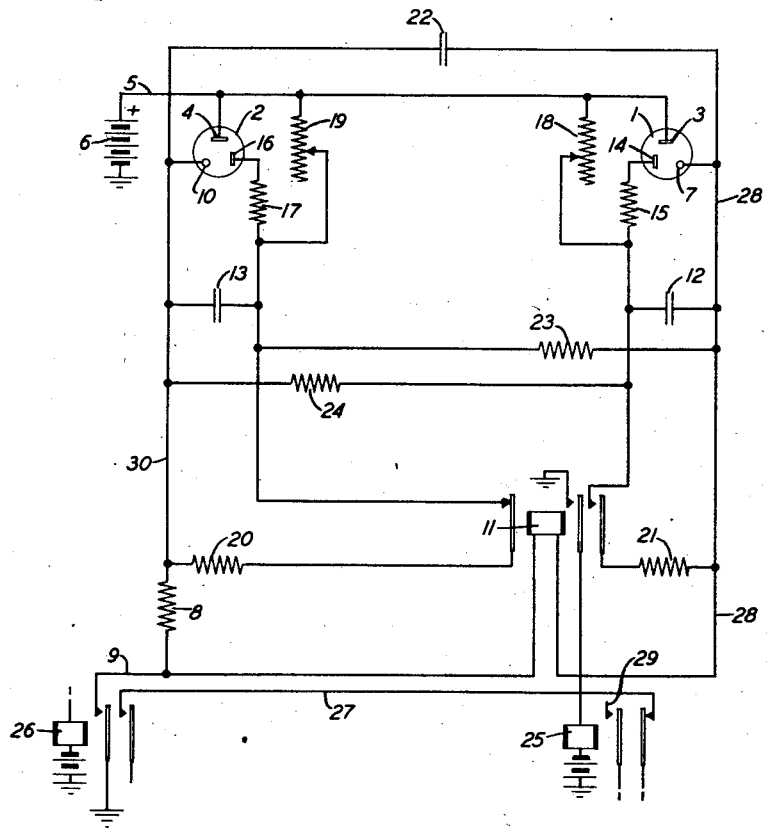
INVENTOR
W. H. T. HOLDEN
BY M. T. McKenney
ATTORNEY Patented Mar. 6, 1945

2,370,727

UNITED STATES PATENT OFFICE 2,370,727

TIME MEASURING SYSTEM

William H. T. Holden, Woodside, N. Y., assignor to Bell Telephone Laboratories, Incorporated, New York, N. Y., a corporation of New York Application December 11, 1942, Serial No. 468,655

4 Claims. (Cl. 175—320)

This invention relates to time measuring and particularly to time-measuring devices for controlling the closing and opening of circuits in communication and other electrical systems.

The objects of the invention are to obtain a greater degree of accuracy in the measurement of time intervals frequently required in the control of electrical circuits; to realize simplification and economy in the devices used for measuring these intervals of time; to substitute electronic devices for the power-driven devices commonly used in the past; and to effect other improvements in time-measuring systems and devices.

The foregoing objects of the invention, as well as other advantages not mentioned, are realized by means of a measuring system comprising a pair of space-discharge tubes, a pair of condensers, and associated charge-controlling resistors for measuring the desired intervals of time, together with circuits and relay means for effecting the necessary cooperation between the discharge tubes to bring about the cyclic repetition of the desired measured intervals of time. More specifically, each of the tubes is provided with a starting gap and main discharge gap, each of the time-measuring condensers is connected in series with its resistor across a source of voltage and is also connected across the starting gap of the associated tube, the main discharge circuit of one of the tubes includes the winding of a relay which serves to open and close shunt circuits around the condensers, and a commutating condenser is connected between the cathodes of both tubes for the purpose of quenching either tube upon the discharge of the other. When in its released condition, the relay opens the shunt around the condenser associated with the first tube, namely, the tube having the relay winding in its main discharge circuit, and the condenser charges through the associated resistor to the ionizing voltage of the starting gap and in so doing measures a desired interval of time. At the end of this interval the tube ionizes, and the relay operates in the main discharge gap, closing the shunt around the associated condenser to discharge the same and opening the shunt around the condenser associated with the second tube. Thereupon the condenser of the second tube charges through its associated resistor to the ionizing voltage of the starting gap and in so doing measures a second desired interval of time. At the end of this second interval the second tube discharges, and a potential is applied through the commutating condenser to the cathode of the first tube, causing the quenching of the first tube and the consequent release of the relay. The release of the relay terminates the second measured interval and conditions the circuits for the next cycle.

Thus, it is possible by selecting the desired values of the charging resistors to obtain two successive, accurately measured intervals of time and to repeat these intervals cyclically, the relay operating and releasing to define the measured intervals and serving to close and open electrical circuits for utilizing them in any desired manner.

The foregoing and other features of the invention will be discussed more fully in the following detailed specification.

The drawing accompanying the specification discloses one embodiment of a time-measuring system incorporating the features of this invention.

Systems and devices designed for the measurement of one or more predetermined time intervals and for repeating the measured intervals cyclically have many uses in the electrical arts and particularly in telephone, telegraph and other communication systems where numerous circuit closures and openings must be performed in definite sequences. In automatic telephone systems, for example, there are many instances in which it is necessary to measure one or more definite intervals of time following the occurrence of some event, such as the operation or the release of a specific relay. Also in these systems the automatic signaling of a called subscriber requires a timing mechanism or interrupter designed to measure alternate ringing and silent intervals, the length of these intervals having definite and predetermined values. It has been common practice in the past to obtain these measured intervals by means of mechanical interrupters which generally involve rotating or other power-driven devices. In the system of the present invention it is proposed to dispense with these mechanical time-measuring devices and substitute therefor a simplified arrangement including a pair of cold cathode gas-filled discharge tubes. This new tube interrupter system not only has the advantages of simplicity and economy compared with other forms of time-measuring devices, but it is also capable of a high degree of accuracy and precision in the measurement of the desired intervals. Also it is capable of a wide range of applications to specific requirements.

Referring to the drawing, the time-measuring system therein disclosed includes a pair of gas-filled discharge tubes 1 and 2, which may be of any suitable and well-known type. These tubes have a main anode and a main cathode forming the main discharge gap and also an auxiliary anode which forms a starting gap with the main cathode. The main anodes 3 and 4 are connected over the common conductor 5 to the positive pole of the battery 6. The cathode 7 of tube 1 is connected through the winding of relay 11 to the common conductor 9, which is connected to ground when desired, and the cathode 10 of tube 2 is connected through the resistor 8, the resistance of which is substantially the same as the winding of relay 11, to the conductor 9.

The system also includes a pair of time-measuring condensers 12 and 13 individual respectively to the tubes 1 and 2. The condenser 12 is connected across the starting gap formed by the cathode 7 and the auxiliary or starting anode 14 in a circuit including the current limiting resistor 15. Similarly, the condenser 13 is connected across the starting gap formed by the cathode 10 and starting anode 16 in a circuit including the current limiting resistor 17. The charging circuit of condenser 12 includes a resistor 18 and the winding of relay 11. The value of the resistor 18 is so chosen that the condenser 12 reaches the operating voltage of the starting gap 7—14 in a period of time which is equal to the first desired measured interval. In like manner the charging circuit of the condenser 13 includes a resistor 19 and the resistor 8, and the value of resistor 19 is such that condenser 13 requires a period equal to the second desired measured interval in which to accumulate a charge sufficient to ionize the starting gap 10—16 of the tube 2.

Since both of the condenser charging circuits are connected directly between the battery conductor 5 and the conductor 9, it is necessary to provide some means to enable these charging circuits alternately so that one condenser remains ineffective while the other condenser is accumulating a charge to measure its interval of time. This enabling means consists of a pair of shunt circuits for the condensers 12 and 13, these circuits being alternately opened and closed by the relay 11. For example, the shunt circuit around the condenser 13 includes the resistor 20 and is closed while the relay 11 is in its normal or released condition. On the other hand, the shunt circuit around condenser 12 includes the resistor 21 and is opened while the relay 11 is released. When the relay operates, which it does once per cycle of the system, it opens the shunt around condenser 13 and closes the shunt around condenser 12.

The main cathodes 7 and 10 of the tubes are interconnected by a commutating condenser 22. The purpose of this condenser is to quench the tube last operated upon the subsequent discharge of the other tube.

The system also includes a pair of resistors 23 and 24 of relatively high value, the purpose of which is to divide the voltage of the source 6 so that only a portion thereof is applied to the condensers 12 and 13 for charging them. The resistor 23 also serves, as will be explained hereinafter, to drain the condenser 12 under certain release conditions.

Relay 11, which operates as will be seen upon the discharge of one tube and releases upon the discharge of the other tube, serves thereby to mark the termination of the two measured intervals of time. These intervals may be utilized in any desired manner to control the opening and closing of circuits, such as those illustrated at the contacts of the auxiliary relay 25 which follows the operation and release of the relay 11.

When it is desired to commence the measurement of the time intervals, the start relay 26 is operated to apply ground potential to conductor 9. As soon as relay 26 operates, a circuit is closed from the positive pole of battery 6, conductor 5, resistor 18, thence in parallel through resistors 24 and 8 to the grounded conductor 9 and through the time-measuring condenser 12 and the winding of relay 11 to conductor 9. At the same time a circuit is closed from positive pole of battery 6, conductor 5, resistor 19, thence in parallel through resistor 23 and the winding of relay 11 to the grounded conductor 9 and through the time-measuring condenser 13 and resistor 8 to the grounded conductor 9. Relay 11, being released at this moment, maintains the shunt circuit around the condenser 13 to prevent this condenser from assuming a charge. The shunt for condenser 12, however, is open at the contacts of relay 11, and charging current flows into the condenser 12 at a rate determined by the value of resistor 18 and by the resistance values of resistors 24 and 8 and the winding of relay 11. The charging current flowing in this circuit, however, is insufficient to cause the operation of relay 11. With other values fixed, the value of resistor 18 may be varied until the charging time of condenser 12 is exactly equal to the first desired interval of time. This first measured interval commences with the operation of relay 26 and the consequent closure of circuit 27 and continues until the condenser 12 is charged to the ionizing voltage of the gap 7—14. When this voltage is reached, the starting gap of the tube 1 ionizes, transfer of ionization takes place to the main gap, and current flows from the positive pole of battery 6, conductor 5, anode 3, cathode 7, conductor 28, winding of relay 11, to the grounded conductor 9. Relay 11 operates in this circuit and operates relay 25 to mark the termination of the first measured interval of time by opening the circuit 27 and by closing any other desired circuit, such as the circuit 29.

The relay 11 in operating closes a shunt around condenser 12 to drain the condenser so that it may be ready to measure its interval when the next cycle arrives. Relay 11 also opens the shunt around the condenser 13, marking the commencement of the second desired measured interval. With fixed values for the other resistors involved in the charging circuit of condenser 13, the duration of this second measured interval may be determined at any desired value by adjusting the value of the common resistor 19. When at the end of the second measured interval the condenser 13 accumulates a voltage equal to the ionizing voltage of the starting gap 10—16, the tube 2 becomes ionized, and current flows from the positive pole of battery 6, conductor 5, anode 4, cathode 10, conductor 30, resistor 8 to the grounded conductor 9. The flow of current through the resistor 8 in this circuit raises the potential on conductor 30 to a positive value determined by the value of the resistor. The instant this positive potential appears on conductor 30 it is transmitted through the condenser 22 to conductor 28 and to the cathode 7 of the conducting tube 1. The application of positive potential to the cathode 7 lowers the voltage across the main discharge gap of the tube 1 below the sustaining value thereof. Thereupon the tube 1 quenches its discharge, and relay 11 releases. It will be noted that the condenser 22 charges in a circuit including the winding of relay 11 following the discharge of tube 2. However, by selecting the capacity of condenser 22 only as high as is necessary to insure the quenching of the tube 1, the duration of current flow through the winding of relay 11 following the discharge of tube 2 can be reduced to a negligible minimum. Relay 11 releases relay 25 which opens the circuit 29 and recloses the circuit 27. Relay 11 closes the shunt around condenser 13 to drain the condenser and place it in readiness for its next measuring interval.

The system is now ready to repeat the measuring cycle, and condenser 12 recharges to measure again the first interval of time. At the end of this interval the starting gap of the tube 1 ionizes, and current flows in the main discharge circuit to reoperate the relay 11. The flow of current through the winding of relay 11 raises the conductor 28 to a positive potential with respect to ground, and this positive potential is transmitted through the condenser 22 to the cathode 10 of the conducting tube 2. The application of this positive potential to the cathode 10 lowers the voltage across the main gap of the tube 2 below the sustaining value. Thereupon the tube 2 quenches its discharge and lowers the positive potential of conductor 30. When tube 1 discharges and tube 2 quenches, as above explained, the commutating condenser 22 is charged in the reverse direction in series with the resistor 8. The condenser 13 is now recharged to measure again the second desired interval of time, and at the end of this interval the tube 2 discharges and applies a positive potential through the condenser 22 to discharge the tube 1 and cause the release of relay 11.

This cycle of operations is repeated as long as the control relay 26 is maintained in its energized condition, and during each cycle the relay 25 operates to signify the end of one measured interval and releases to signify the end of the other measured interval. When it is desired to discontinue the measuring operation, relay 26 is released to remove ground potential from conductor 9. The removal of ground potential from this conductor quenches whichever one of the tubes happens to be discharged at the moment, and relays 11 and 25, if operated, restore to their normal condition. Should the measuring operation be terminated in that half of the cycle in which condenser 12 is being charged, the condenser is drained by means of a circuit traceable from its right-hand terminal, conductor 28, winding of relay 11, resistor 8, resistor 24, to the other terminal of the condenser. Although this circuit is permanently closed, the value of resistor 24 is made sufficiently high not to interfere with the time-measuring function of the condenser.

It will be understood that the two intervals of time measured during each operating cycle of the system may be equal to each other or may bear any other desired relation. The absolute values of these intervals and their relation to each other are determined by the values of the resistors 18 and 19.

What is claimed is:

1. The combination in a time-measuring system of a first discharge device having a starting gap and a main gap, a first condenser connected across said starting gap, a shunt circuit for said condenser capable of being opened and closed, a second discharge device having a starting gap and a main gap, a second condenser connected across the starting gap of said second discharge device, a shunt circuit for said second condenser capable of being opened and closed, a source of voltage, charging circuits connecting said source to said condensers, each including a resistor for determining the rate of charge of the associated condenser, said source serving to charge said first condenser in a measured interval to a value sufficient to operate the starting gap of said first device provided the associated shunt circuit is open, a main operating circuit for the flow of current in the main gap of said first device responsive to the operation of its starting gap, a relay responsive to current in said main gap circuit, said relay serving to close the shunt around said first condenser to prevent further charging thereof and to open the shunt circuit of said second condenser, said source thereupon effective to charge said second condenser in a measured interval to a value sufficient to operate the starting gap of said second discharge device, a circuit for the main gap of said second discharge device effective in response to the operation of the starting gap for extinguishing said first device and releasing said relay, and means controlled by said relay in accordance with the intervals measured by said condensers.

2. The combination in a time-measuring system of a first discharge tube having a starting gap and a main gap, a first condenser individual to said tube, a shunt circuit for said condenser capable of being opened and closed, a second discharge tube having a starting gap and a main gap, a second condenser individual to said second tube, a shunt circuit for said second condenser capable of being opened and closed, a source of voltage, charging circuits connected to said source for charging said condensers to the operating voltage of said starting gaps, each charging circuit including a resistor having a selected value for measuring a desired interval of time preceding the operation of the associated starting gap, a main operating circuit for the flow of current in the main gap of said first discharge tube responsive to the operation of its starting gap, a relay responsive to current in said main gap circuit, said relay serving to close the shunt circuit around said first condenser to discharge the same and to open the shunt circuit around said second condenser, said source thereupon effective to charge said second condenser to the operating value of the associated discharge tube, a circuit for the main gap of said second tube effective in response to the operation of the starting gap for extinguishing said first tube and releasing said relay, and circuit means controlled by said relay in accordance with the intervals measured by said condensers.

3. The combination in a time-measuring system of a pair of discharge tubes, a pair of condensers individual respectively to said tubes, a pair of resistors individual respectively to said condensers, a source of voltage for charging each condenser through the associated resistor to the ionizing voltage of the associated tube, the values of said resistors being chosen to measure desired intervals of time preceding the ionization of the associated tubes, a relay, a shunt circuit for one of said condensers closed in the normal position of said relay and opened in the operated position of said relay, a shunt circuit for the other of said condensers opened in the normal position of said relay and closed in the operated position of said relay, a main discharge circuit for one of said tubes effective when the tube ionizes at the end of the measured interval to cause the operation of said relay, and a main discharge circuit for the other of said tubes effective when the tube ionizes at the end of the corresponding measured interval for causing the release of said relay.

4. The combination in a time-measuring system of a pair of discharge tubes, a pair of condensers individual respectively to said tubes, a pair of resistors individual respectively to said condensers, a source of voltage for charging each condenser through the associated resistor to the ionizing voltage of the associated tube, the values of said resistors being chosen to measure desired intervals of time preceding the ionization of the associated tubes, a relay, a shunt circuit for one of said condensers closed in the normal position of said relay and opened in the operated position of said relay, a shunt circuit for the other of said condensers opened in the normal position of said relay and closed in the operated position of said relay, a main discharge circuit for one of said tubes effective when the tube ionizes at the end of the measured interval to cause the operation of said relay, a main discharge circuit for the other of said tubes effective when the tube ionizes at the end of the corresponding measured interval, and a condenser connected between the main discharge circuits of said tubes and effective upon the discharge of either tube to extinguish the discharge of the other tube.

WILLIAM H. T. HOLDEN.